United States Patent
Shang (10) Patent No.: US 9,306,780 B2
(45) Date of Patent: Apr. 5, 2016

(54) OPTICAL TRANSMISSION FOR BINARY AND DUOBINARY MODULATION FORMATS

(71) Applicant: Semtech Corporation, Camarillo, CA (US)

(72) Inventor: Song Quan Shang, Palo Alto, CA (US)

(73) Assignee: SEMTECH CORPORATION, Camarillo, CA (US)

( * ) Notice: Subject to any disclaimer, the term of this patent is extended or adjusted under 35 U.S.C. 154(b) by 114 days.

(21) Appl. No.: 13/793,264

(22) Filed: Mar. 11, 2013

(65) Prior Publication Data
US 2014/0255037 A1 Sep. 11, 2014

(51) Int. Cl.
| | | |
|---|---|---|
| H04B 10/40 | (2013.01) |
| H04L 25/03 | (2006.01) |
| H04B 10/25 | (2013.01) |
| H04L 27/01 | (2006.01) |
| H04B 10/50 | (2013.01) |
| H04B 10/516 | (2013.01) |
| H04B 10/69 | (2013.01) |

(52) U.S. Cl.
CPC ............ *H04L 27/01* (2013.01); *H04B 10/5055* (2013.01); *H04B 10/5167* (2013.01); *H04B 10/6971* (2013.01); *H04B 2210/254* (2013.01)

(58) Field of Classification Search
CPC ............ H04B 10/5055; H04B 10/508; H04B 10/695; H04B 10/541
USPC ......................................... 398/135, 186, 115
See application file for complete search history.

(56) References Cited

U.S. PATENT DOCUMENTS

| | | | | |
|---|---|---|---|---|
| 6,751,255 | B1 * | 6/2004 | Reuven et al. ................. | 375/233 |
| 7,769,099 | B2 * | 8/2010 | Parhi et al. .................... | 375/285 |
| 7,924,912 | B1 * | 4/2011 | Rokhsaz et al. ............... | 375/233 |
| 2005/0135510 | A1 * | 6/2005 | Momtaz ........................ | 375/340 |
| 2007/0116476 | A1 * | 5/2007 | Bai ................................ | 398/183 |
| 2009/0047025 | A1 * | 2/2009 | Hong et al. .................... | 398/135 |
| 2011/0052216 | A1 * | 3/2011 | Jiang et al. .................... | 398/208 |
| 2011/0191656 | A1 * | 8/2011 | Bliss et al. .................... | 714/776 |
| 2013/0188965 | A1 * | 7/2013 | Afriat et al. ................... | 398/136 |
| 2014/0255037 | A1 * | 9/2014 | Shang ............................ | 398/115 |

OTHER PUBLICATIONS

May, et al. "Extended 10 Gb/s Fiber Transmission Distance at 1538 nm Using a Duobinary Receiver," IEEE Photonics Technology Letters, vol. 6, No. 5, May 1994, 648-650.
Kam, et al. "Link Simulations for Partial Response Signaling," Optical Internetworking Forum, Apr. 25, 2008, 14 pages.

* cited by examiner

*Primary Examiner* — Oommen Jacob
(74) *Attorney, Agent, or Firm* — Amin, Turocy & Watson, LLP (57) ABSTRACT

A transceiver includes a transmitter and a receiver. The transmitter includes a precoder stage, an encoder stage and a first converter stage. The precoder stage receives an input binary signal and a previously processed binary signal. The encoder stage is electrically coupled to the precoder stage and the first converter stage and includes a feed forward equalizer (FFE). The first converter stage generates a modulated signal. The receiver includes a second converter stage, an amplifier stage, a first equalizer stage and a second equalizer stage. The second converter stage receives the modulated signal. The first equalizer stage is electrically coupled to the amplifier stage. The second equalizer stage is electrically coupled to the first equalizer stage. The second equalizer stage includes a decision feedback equalizer (DFE) that converts the modulated signal into an output binary signal.

20 Claims, 11 Drawing Sheets

OPTICAL TRANSMISSION FOR BINARY AND DUOBINARY MODULATION FORMATS

TECHNICAL FIELD

This disclosure relates generally to optical transmission including, but not limited to, optically transmitting binary and/or duobinary modulation formats.

BACKGROUND

Conventional transceiver technologies for optical transmission can implement an on/off modulation scheme (e.g., an on/off laser diode) to transmit binary data. Additionally, conventional transceiver technologies can utilize active and/or passive filters (e.g., a band limiting filter) and one or more decision circuits (e.g., one or more D flip-flops) to recover originally transmitted binary data. However, such technologies can be improved to enable higher data rate transmission and/or higher data rate reception.

The above-described deficiencies of today's optical transmission systems and related technologies are merely intended to provide an overview of some of the problems of conventional technology, and are not intended to be exhaustive, representative, or always applicable. Other problems with the state of the art, and corresponding benefits of some of the various non-limiting embodiments described herein, may become further apparent upon review of the following detailed description.

SUMMARY

A simplified summary is provided herein to help enable a basic or general understanding of various aspects of illustrative, non-limiting embodiments that follow in the more detailed description and the accompanying drawings. This summary is not intended, however, as an extensive or exhaustive overview. Instead, the sole purpose of this summary is to present some concepts related to some illustrative non-limiting embodiments in a simplified form as a prelude to the more detailed description of the various embodiments that follow. It will also be appreciated that the detailed description may include additional or alternative embodiments beyond those described in this summary.

In a non-limiting embodiment of the subject disclosure, a transceiver is described for optically transmitting data. The transceiver includes a transmitter and a receiver. The transmitter includes a precoder stage, an encoder stage and a first converter stage. The precoder stage receives an input binary signal and a previously processed binary signal. The encoder stage is electrically coupled to the precoder stage and the first converter stage and includes a feed forward equalizer (FFE). The first converter stage generates a modulated signal. The receiver includes a second converter stage, an amplifier stage, a first equalizer stage and a second equalizer stage. The second converter stage receives the modulated signal. The first equalizer stage is electrically coupled to the amplifier stage. The second equalizer stage is electrically coupled to the first equalizer stage. The second equalizer stage includes a decision feedback equalizer (DFE) that converts the modulated signal into an output binary signal.

In another non-limiting embodiment of the subject disclosure, a method comprises receiving binary input data, generating precoded data based on the binary input data and previously processed binary data, filtering the precoded data via a feed forward equalizer (FFE) to generate multilevel data, generating a modulated signal from the multilevel data, and converting the modulated signal into binary output data based at least in part on a decision feedback equalizer (DFE).

In yet another non-limiting embodiment of the subject disclosure, a system comprises a transmitter and a receiver. The transmitter generates a modulated duobinary signal. The transmitter includes at least a feed forward equalizer (FFE). The receiver generates an electrical signal from the modulated duobinary signal. The receiver includes at least a decision feedback equalizer (DFE) to equalize the electrical signal.

Other embodiments and various non-limiting examples, scenarios, and implementations are described in more detail below.

BRIEF DESCRIPTION OF THE DRAWINGS

Various non-limiting embodiments are further described with reference to the accompanying drawings in which.

DETAILED DESCRIPTION

In the following description, numerous specific details are set forth to provide a thorough understanding of the implementations of the subject disclosure. One skilled in the relevant art will recognize, however, that the implementations described herein are practiced without one or more of the specific details, or with other methods, components, materials, etc. In other instances, well-known structures, materials, or operations are not shown or described in detail to avoid obscuring certain aspects.

According to an aspect of the subject disclosure, described herein is a transmitter that includes at least a feed forward equalizer (FFE) to generate duobinary data (or binary data) and a receiver that includes at least a decision feedback equalizer (DFE) to equalize duobinary data (or binary data) received from the transmitter. As such, non-return-to-zero (NRZ) binary coding (e.g., pulse amplitude modulation (PAM)-2 coding) and/or duobinary coding (e.g., PAM-3 coding) can be supported by a transmitter and/or a receiver (e.g., a transceiver system). Therefore, a low-bandwidth optical component can be enabled for higher data rate transmission. Additionally, chromatic dispersion tolerance and/or cost can be improved.

In an implementation of the subject disclosure, a transceiver includes a transmitter and a receiver. The transmitter includes a precoder stage, an encoder stage and a first converter stage. The precoder stage receives an input binary signal and a previously processed binary signal. The encoder stage is electrically coupled to the precoder stage and the converter stage and includes a feed forward equalizer (FFE). The first converter stage generates a modulated signal. In one embodiment, the first converter stage includes an electrical-optical (EO) converter. The receiver includes a second converter stage, an amplifier stage, a first equalizer stage and a second equalizer stage. The second converter stage receives the modulated signal. In one embodiment, the second converter stage includes an optical-electrical (OE) converter. The first equalizer stage is electrically coupled to the amplifier stage. In one embodiment, the amplifier stage includes a transimpedance amplifier (TIA). In one embodiment, the first equalizer stage includes a continuous time linear equalizer (CTLE). The second equalizer stage electrically coupled to the first equalizer stage. The second equalizer stage includes a decision feedback equalizer (DFE) that converts the modulated signal into an output binary signal.

Figure 1:
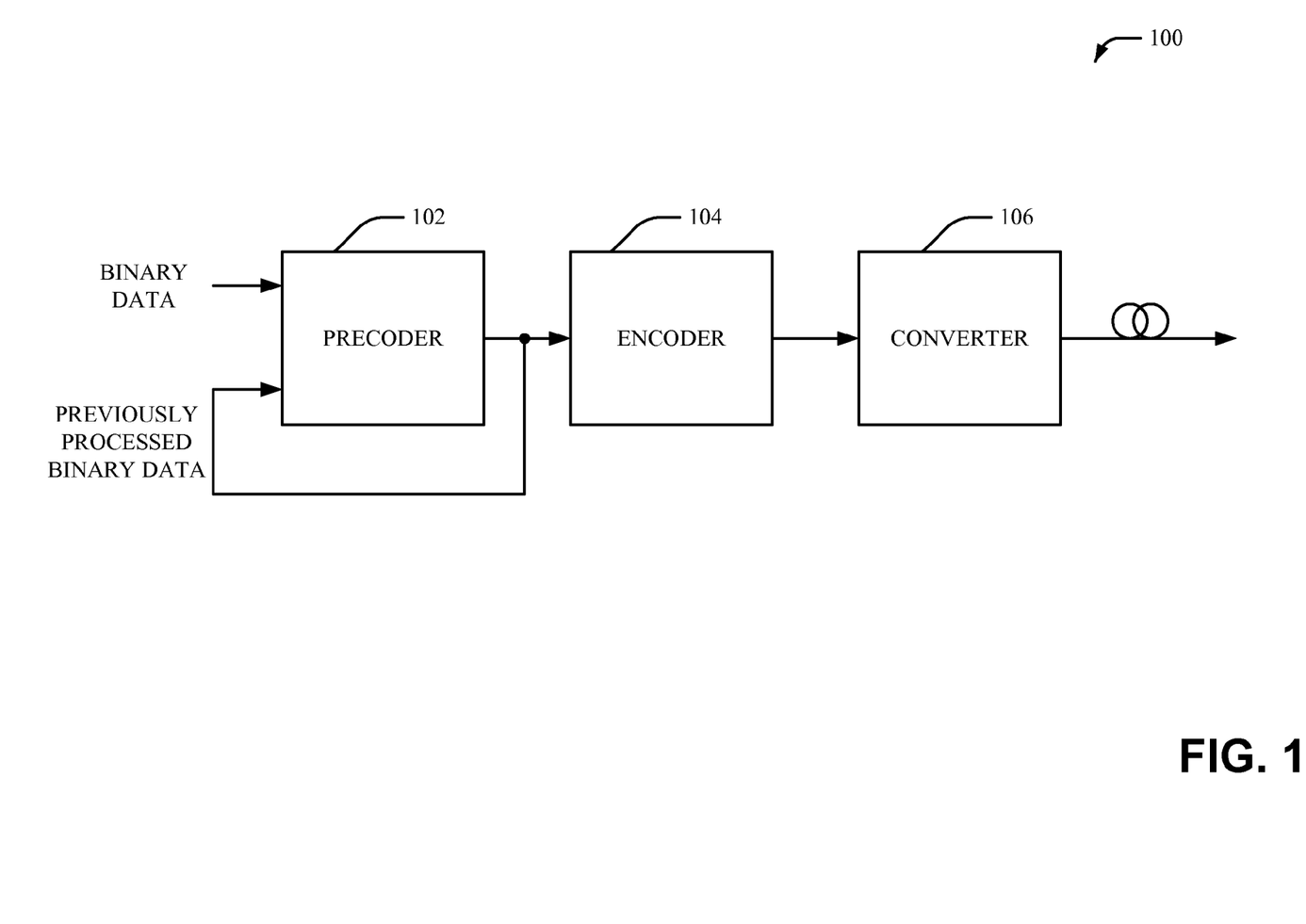
FIG. 1 illustrates a block diagram of a transmitter, in accordance with an embodiment.

Referring initially to FIG. 1, a block diagram of a transmitter is illustrated, in accordance with an embodiment. Transmitter 100 can include a precoder stage (precoder) 102, an encoder stage (FFE) 104 and a converter stage (electrical-optical converter) 106. In one example, the transmitter 100 can be implemented in a transceiver (e.g., a duobinary transceiver). The precoder stage 102 can receive binary data (e.g., BINARY DATA shown in FIG. 1) and previously processed binary data (e.g., PREVIOUSLY PROCESSED BINARY DATA shown in FIG. 1). In one example, the binary data can be a non-return-to-zero (NRZ) binary signal. The previously processed binary data can include one or more delayed binary bits.

The precoder stage 102 can be implemented as a precoder (e.g., a differential precoder). In one example, the precoder stage 102 can be implemented in a bipolar transmission domain (e.g., the precoder stage 102 can implement bipolar encoding). In another example, the precoder stage 102 can be implemented in a digital domain (e.g., the precoder stage 102 can implement digital encoding). The precoder stage 102 can include a logic gate (e.g., an exclusive-OR (XOR) gate) and/or a delayed feedback path. In one example, the precoder stage 102 can include a finite impulse response (FIR) filter (e.g., a delayed FIR filter) to generate delayed data (e.g., one or more delayed bits). The delayed data can include one unit of delay. The precoder stage 102 can be configured to generate precoded data (e.g., a precoded signal) based on the binary data and/or the previously processed binary data. For example, the precoder stage 102 can combine (e.g., mix) the binary data with the previously processed binary data to generate a precoded sequence of data (e.g., a precoded signal).

The precoder stage 102 can be configured to format each bit in the binary data and/or the previously processed binary data (e.g., the precoder stage 102 can be configured to determine a bit value for each bit in the binary data and/or the previously processed binary data). For example, the precoder stage 102 can be configured to format one duobinary symbol at a time for the binary data and/or the previously processed binary data. As such, the precoded data (e.g., the precoded signal) can be decoded on a bit by bit basis. Furthermore, the precoder stage 102 can be configured to reduce (e.g., remove) error propagation of the binary data. The precoder stage 102 can be electrically coupled to the encoder stage 104. The encoder stage 104 can receive the precoded data (e.g., the precoded signal) from the precoder stage 102.

The encoder stage 104 can include an encoder (e.g., a multilevel encoder). For example, the encoder stage 104 can include a feed forward equalizer (FFE). In one example, the encoder stage 104 can be implemented as a 2-bit FFE. However, it is to be appreciated that the equalizer stage can be implemented as a different type of FFE. The encoder stage 104 can be configured as a digital filter. For example, the encoder stage 104 can be configured to filter (e.g., equalize) the precoded data (e.g., the precoded signal). The encoder stage 104 can be configured to filter (e.g., equalize) the precoded data (e.g., the encoder stage 104 can be configured for electronic filtering) to generate multilevel data (e.g., duobinary data). For example, the encoder stage 104 can be configured to generate duobinary code (e.g., a duobinary signal, a multilevel signal, etc.). In one example, the encoder stage 104 can include a laser driver (e.g., a driver circuit) to drive the converter stage 106. The encoder stage 104 can equalize the binary data and/or the previously processed binary data (e.g., the encoder stage 104 can feed forward information from earlier bits to later bits). For example, the encoder stage 104 can apply a weight to the binary data and/or the previously processed binary data (e.g., the encoder stage 104 can generate a weighted signal). In one example, the encoder stage 104 can apply a 50% equal weight to the binary data and the previously processed binary data.

The encoder stage 104 can be implemented as a pre-distortion stage. For example, the encoder stage 104 can add controlled distortion to the precoded data (e.g., the precoded signal) before being modulated by the converter stage 106. As such, the encoder stage 104 can add pre-distortion to the precoded to compensate for signal degradation (e.g., signal degradation when a signal transmitted over a fiber cable). The encoder stage 104 can provide a constant current source to the converter stage 106. As such, the encoder stage 104 can allow a binary signal (e.g., the precoded signal) to be modulated for transmission over a fiber cable. In one example, the encoder stage 104 can be configured to generate a multilevel signal (e.g., a duobinary signal). The multilevel signal (e.g., the duobinary signal) can be received by the converter stage 106. The encoder stage 104 can be electrically coupled to the converter stage 106.

The converter stage 106 can be configured to modulate data (e.g., a signal) received from the encoder stage 104. For example, the converter stage 106 can be configured to modulate the multilevel signal (e.g., the duobinary signal). The converter stage 106 can be implemented as an electrical-optical (EO) converter. In one example, the converter stage 106 can be implemented as a directly modulated laser (DML). As such, the transmitter 100 can generate a modulated signal (e.g., an optical signal) based at least in part on a FFE and a DML. In another example, the converter stage 106 can be implemented as an externally modulated laser (EML). The converter stage 106 can include a light emitting diode (LED) and/or a laser diode (e.g., an on/off laser). As such, the converter stage 106 can generate a modulated signal (e.g., an optical signal). The modulated signal (e.g., the optical signal) can be a band-limiting modulated signal. In one example, the modulated signal can be a PAM-2 (e.g., a NRZ) signal. In another example, the modulated signal can be a PAM-3 signal. As such, the transmitter 100 can be configured to provide dual support for both binary (e.g., NRZ, PAM-3, etc.) and duobinary (e.g., multilevel, bipolar, PAM-3, etc.) modulation formats. However, it is to be appreciated that the modulated signal can be a different type of modulated signal. In one non-limiting example, the modulated signal can be a 100 G modulated signal. In one example, the converter stage 106 can generate a plurality of samples of a signal as represented by an eye diagram (e.g., six samples of a signal represented by an eye pattern diagram).

Figure 2:
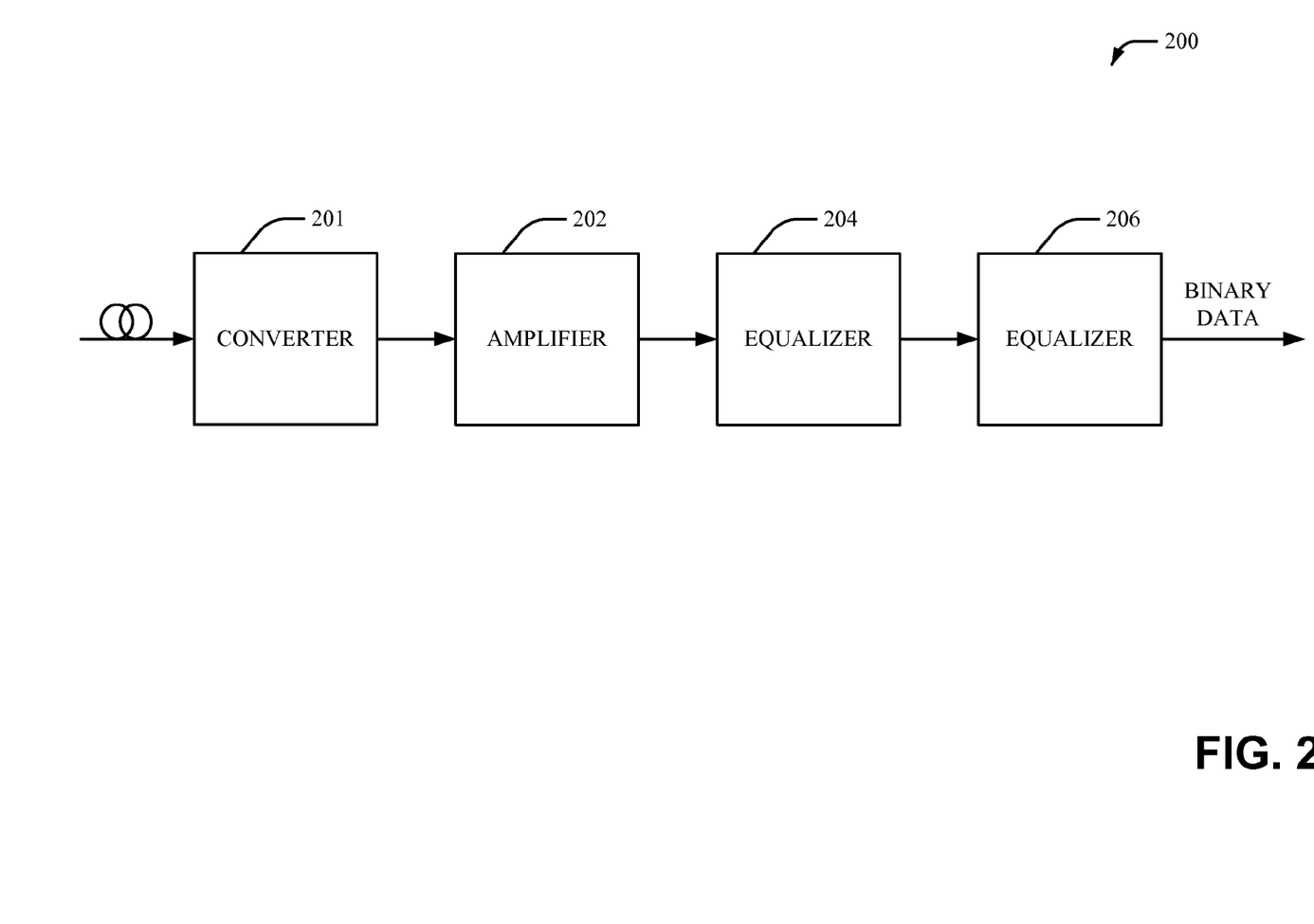
FIG. 2 illustrates a block diagram of a receiver, in accordance with an embodiment.

Referring to FIG. 2, a block diagram of a receiver is shown, in accordance with an embodiment. Receiver 200 can include a converter stage 201, an amplifier stage (TIA) 202, an equalizer stage (CTLE) 204 and an equalizer stage (DFE) 206. In one example, the receiver 200 can be implemented in a transceiver (e.g., a duobinary transceiver). The converter stage 201 can receive a modulated signal (e.g., an optical signal). For example, the converter stage 201 can receive a modulated signal (e.g., an optical signal) from the transmitter 100. In one example, the converter stage 201 can receive six samples of a signal as represented by an eye diagram from the transmitter 100.

The converter stage 201 can be implemented as an optical-electrical (OE) converter. The converter stage 201 can convert the modulated signal into an electrical signal. For example, the converter stage 201 can include at least one photodetector (e.g., at least one photodiode) to convert the modulated signal (e.g., the optical signal) into an electrical current signal. As such, the converter stage 201 can generate an electrical signal (e.g., an electrical current signal) from the modulated signal (e.g., the optical signal).

The amplifier stage 202 can be implemented as a current to voltage amplifier. For example, the amplifier stage 202 can include (e.g., can be implemented as) a transimpedance amplifier (TIA). The amplifier stage 202 can include a TIA that can convert the electrical current signal into an electrical voltage signal. As such, the amplifier stage 202 can generate an electrical voltage signal from the electrical current signal. Additionally, the amplifier stage 202 (e.g., the TIA) can amplify and/or stabilize the electrical current signal. For example, the amplifier stage 202 can provide gain control for the electrical current signal. The amplifier stage 202 can be electrically coupled to the equalizer stage 204.

The equalizer stage 204 and/or the equalizer stage 206 can be configured to correct intentionally introduced distortion (e.g., intentionally introduced distortion generated by the encoder stage 104) through equalization of the electrical signal (e.g., the electrical voltage signal). The equalizer stage 204 can be implemented as a linear front-end equalizer. For example, the equalizer stage 204 can be implemented as a continuous time linear equalizer (CTLE). The equalizer stage 204 can be configured as an analog filter. The equalizer stage 204 can receive the electrical signal (e.g., the electrical voltage signal) from the amplifier stage 202. The equalizer stage 204 can be configured to perform linear equalization. For example, the equalizer stage 204 can be configured to reduce linear distortion of the electrical signal (e.g., the electrical voltage signal). For example, the equalizer stage 204 can be configured to improve a noise margin of the electrical signal (e.g., the electrical voltage signal). As such, the equalizer stage 204 can be configured to provide gain control for the electrical signal (e.g., the electrical voltage signal). The equalizer stage 204 can include one or more passive components (e.g., one or more resistors, one or more capacitors, one or more inductors, etc.). Additionally or alternatively, the equalizer stage can include one or more active components (e.g., one or more amplifiers, etc.).

The equalizer stage 204 can be configured to increase height of an eye opening of the electrical signal (e.g., the electrical voltage signal) as represented by an eye pattern (e.g., a 2D eye diagram). In one example, the equalizer stage 204 can be configured to adjust a voltage level of the electrical signal (e.g., the electrical voltage signal). For example, the equalizer stage 204 can measure a voltage level of the electrical signal (e.g., the electrical voltage signal) and/or compare the voltage level of the electrical signal (e.g., the electrical voltage signal) to a reference voltage value. In one example, the equalizer stage 204 can adjust the voltage level of the electrical signal (e.g., the electrical voltage signal) to match the reference voltage value. As such, the equalizer stage 204 can be configured to improve a signal-to-noise ratio (SNR) of the electrical signal (e.g., the electrical voltage signal). Furthermore, the equalizer stage 204 can be configured to lower a bit error rate (BER) of the electrical signal (e.g., the electrical voltage signal). The equalizer stage 204 can be electrically coupled to the equalizer stage 206.

The equalizer stage 206 can be configured to equalize the electrical signal (e.g., the electrical voltage signal) received from the equalizer stage 204. The equalizer stage 206 can be implemented as a decision feedback equalizer (DFE). For example, the equalizer stage 206 can include a finite impulse response (FIR) filter and/or an infinite impulse response (IIR) filter to provide electrical equalization. The equalizer stage 206 can be configured as a digital filter. The equalizer stage 206 can receive the electrical signal (e.g., the electrical voltage signal). In one example, the electrical signal (e.g., the electrical voltage signal) can be a duobinary signal. In another example, the electrical signal (e.g., the electrical voltage signal) can be a binary signal. The equalizer stage 206 can be configured to generate binary data (e.g., BINARY DATA shown in FIG. 2). In one example, the binary data can be a NRZ binary signal. As such, the equalizer stage 206 can receive a duobinary electrical signal (e.g., a PAM-3 signal) from the equalizer stage 204 and generate a binary signal (e.g., a binary NRZ signal). In one example, the equalizer stage 206 can process PAM-3 data as NRZ binary code with intersymbol interference (ISI). As such, the equalizer stage 206 can be configured to translate duobinary data (e.g., multilevel data) into binary data. Alternatively, the equalizer stage 206 can receive an electrical binary signal (e.g., a NRZ binary signal) and generate a new binary signal (e.g., a new binary NRZ signal). As such, the equalizer stage 206 can alternatively be configured to translate binary data into new binary data.

The equalizer stage 206 can be configured to increase width of an eye opening of the electrical signal (e.g., the electrical voltage signal) as represented by an eye pattern (e.g., a 2D eye diagram). The equalizer stage 206 can be configured to quantize the electrical signal (e.g., the electrical voltage signal) received from the equalizer stage 204. Additionally, the equalizer stage 206 can be configured to add delay and/or alter waveform characteristics of the electrical signal (e.g., the electrical voltage signal) to eliminate noise-gain from the electrical signal (e.g., the electrical voltage signal). Furthermore, the equalizer stage 206 can be configured to reduce jitter of the electrical signal (e.g., the electrical voltage signal). Therefore, the equalizer stage 206 can be configured to inverse bandwidth loss of the electrical signal (e.g., the electrical voltage signal) to improve bandwidth of the modulated signal.

Figure 3:
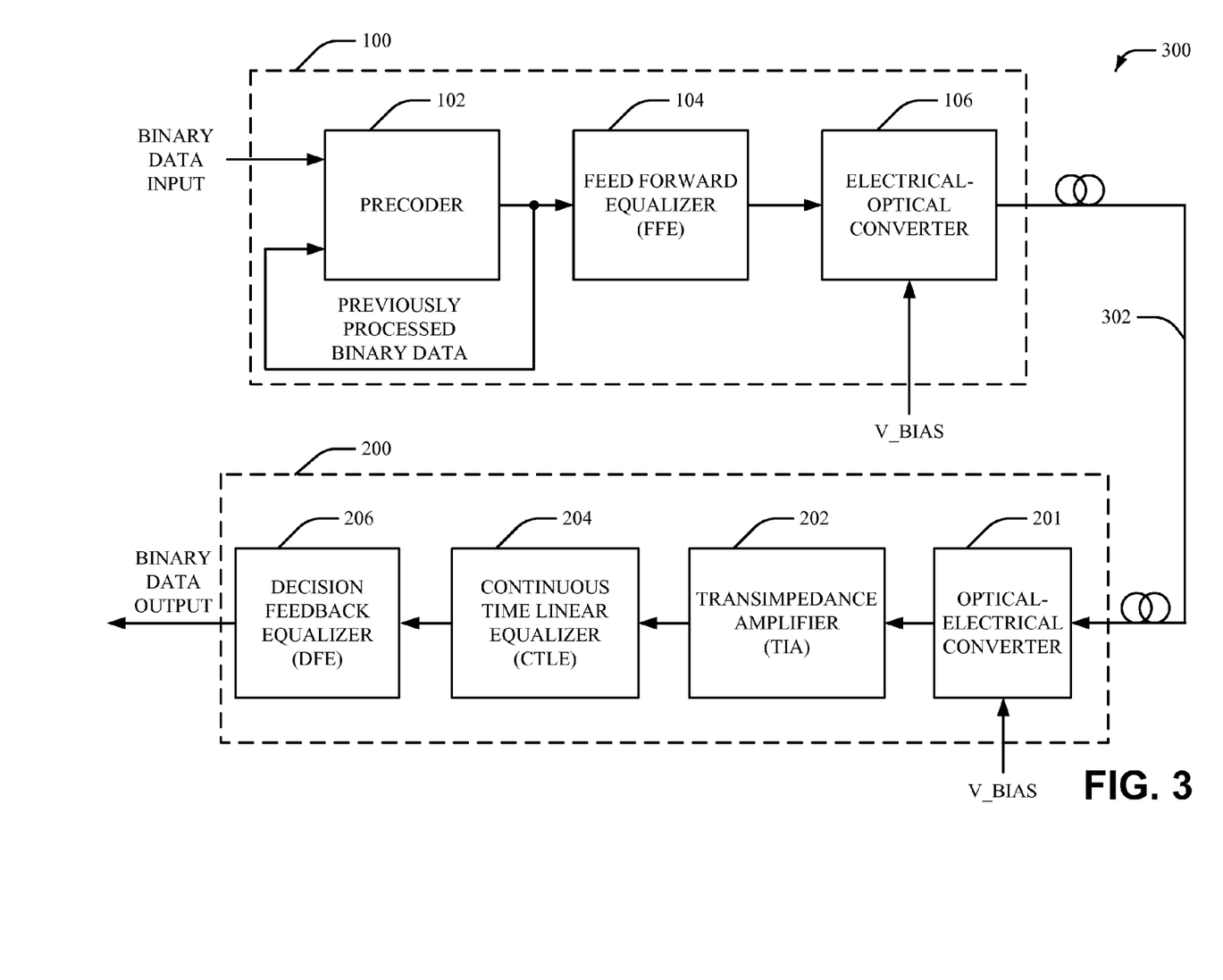
FIG. 3 illustrates a block diagram of a transceiver, in accordance with an embodiment.

Referring now to FIG. 3, a block diagram of a transceiver is shown, in accordance with an embodiment. Transceiver 300 can include the transmitter 100 and the receiver 200. In one example, the transceiver 300 can be implemented on a silicon-germanium (SiGe) integrated circuit. However, it is to be appreciated that the transceiver 300 can be implemented on a different type of semiconductor material. In one example, the transceiver 300 can be implemented as a duobinary transceiver. The transmitter 100 can include the precoder 102 (e.g., precoder stage 102), the FFE 104 (e.g., encoder stage 104) and the electrical-optical converter 106 (e.g., the converter stage 106). The receiver 200 can include the optical-electrical converter 201 (e.g., the converter stage 201), the TIA 202 (e.g., amplifier stage 202), the CTLE 204 (e.g., equalizer stage 204) and the DFE 206 (e.g., the equalizer stage 206). In one example, the transceiver 300 can be implemented as a duobinary transceiver.

The transceiver 300 (e.g., the transmitter 100) can receive binary data input (e.g., BINARY DATA INPUT shown in FIG. 3). The transmitter 100 can generate a modulated signal (e.g. an optical signal). The modulated signal can be transmitted via a transmission line 302 to the receiver 200. In one example, the transmission line 302 can be implemented as an optical fiber. In one example, the transmission line 302 can be two kilometers in length. However, it is to be appreciated that the transmission line 302 can be implemented as a different length. The receiver 200 can generate binary data output (e.g., BINARY DATA OUTPUT shown in FIG. 3). In one example, the electrical-optical converter 106 and/or the optical-electrical converter 201 can receive a voltage bias signal (e.g., V_BIAS shown in FIG. 3). For example, the voltage bias can be applied to a terminal (e.g., a cathode terminal) of a diode (e.g., a photodiode) implemented in the electrical-optical converter 106 and/or the optical-electrical converter 201. The transceiver 300 can utilize a FFE (e.g., a FFE in the encoder stage 104) in the transmitter 100 and/or a DFE (e.g., a DFE in the equalizer stage 206) in the receiver 200, as more fully disclosed herein. As such, the transceiver 300 can be configured for binary and/or duobinary optical transmission. Therefore, the transceiver 300 can be enabled for higher data rate transmission.

Figure 4:
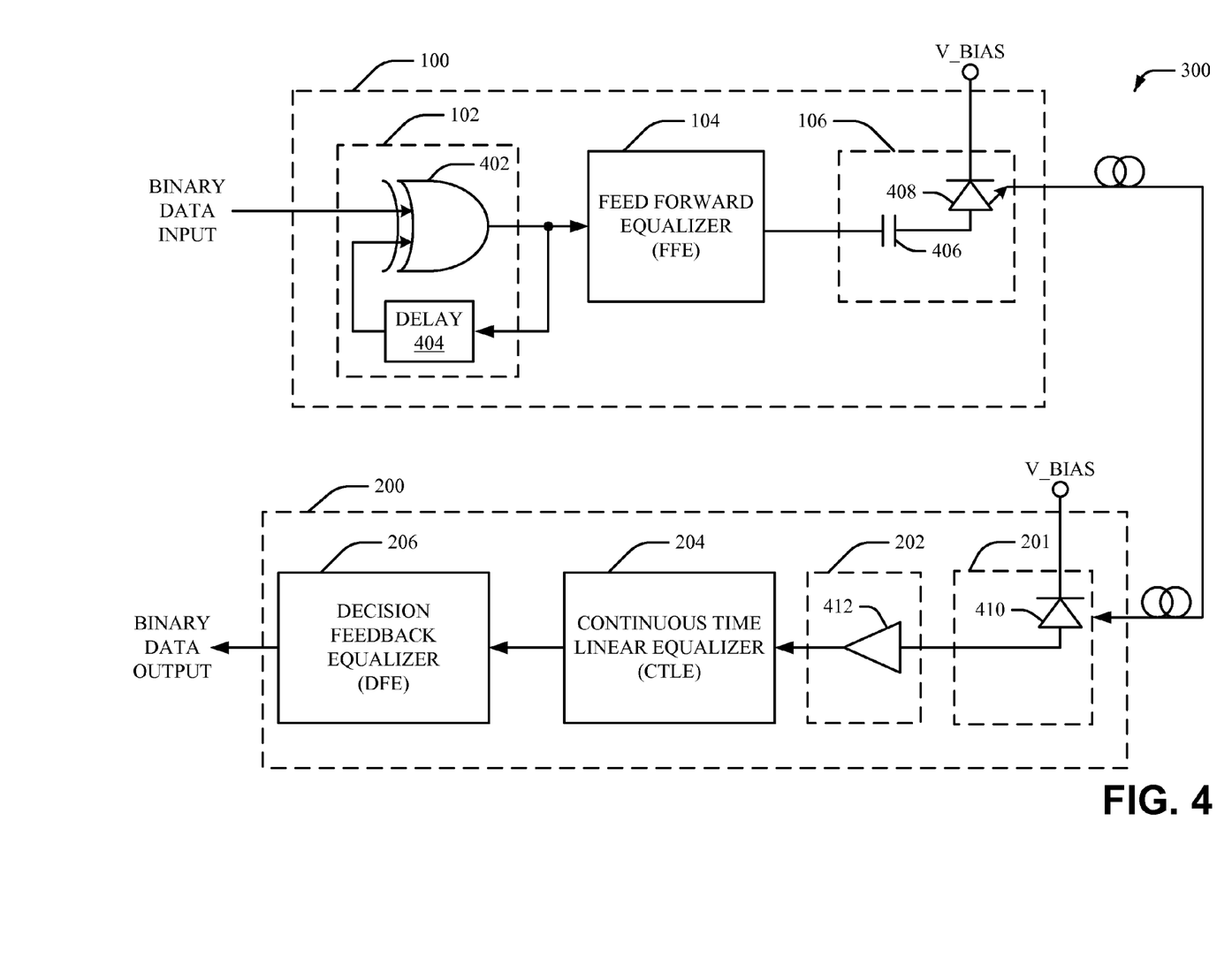
FIG. 4 illustrates a block diagram of a transceiver, in accordance with another embodiment.

Now referring to FIG. 4, a block diagram of a transceiver system is shown, in accordance with an embodiment. Transceiver 400 can include the transmitter 100 and the receiver 200. The transmitter 100 can include the precoder 102 (e.g., precoder stage 102), the FFE 104 (e.g., encoder stage 104) and the electrical-optical converter 106 (e.g., the converter stage 106). The receiver 200 can include the optical-electrical converter 201 (e.g., the converter stage 201), TIA 202 (e.g., amplifier stage 202), the CTLE 204 (e.g., equalizer stage 204) and the DFE 206 (e.g., the equalizer stage 206).

The precoder 102 can include a logic gate 402 and delay stage 404. The delay stage 404 can be configured to delay one or more bits. In one example, the delay stage 404 can be implemented as a delayed FIR filter. As such, the delay stage 404 can generate and/or add delay (e.g., one unit of delay) to previously processed data. The logic gate 402 can receive the binary data input and the previously processed binary data. In one example, the logic gate 402 can be implemented as an XOR gate. Therefore, the logic gate 402 can generate precoded data (e.g., a precoded signal).

The electrical-optical converter 106 can include a capacitor 406 and a diode 408. In one example, the diode 408 can be a laser diode (e.g., a DML or an EML). In another example, the diode 408 can be a light-emitting diode (LED). The cathode terminal of the diode 408 can be electrically coupled, for example, to a voltage bias (e.g., V_BIAS) and the anode terminal of the diode 408 can be electrically coupled, for example, to the capacitor 406. As such, the diode 408 can be implemented to generate a modulated signal (e.g., an optical signal).

The optical-electrical converter 201 can include a diode 410. In one example, the diode 410 can be a photodetector (e.g., a photodiode, a PIN diode, etc.). The cathode terminal of the diode 410 can be electrically coupled, for example, to a voltage bias (e.g., V_BIAS) and the anode terminal of the diode 410 can be electrically coupled, for example, to the amplifier 412. The diode 410 can be implemented to convert the modulated signal (e.g., the optical signal) into an electrical current signal.

The TIA 202 can include an amplifier 412. In one example, the amplifier 412 can be a transimpedance amplifier. The amplifier 412 (e.g., the TIA) can be implemented to convert the electrical current signal into an electrical voltage signal.

Figure 5:
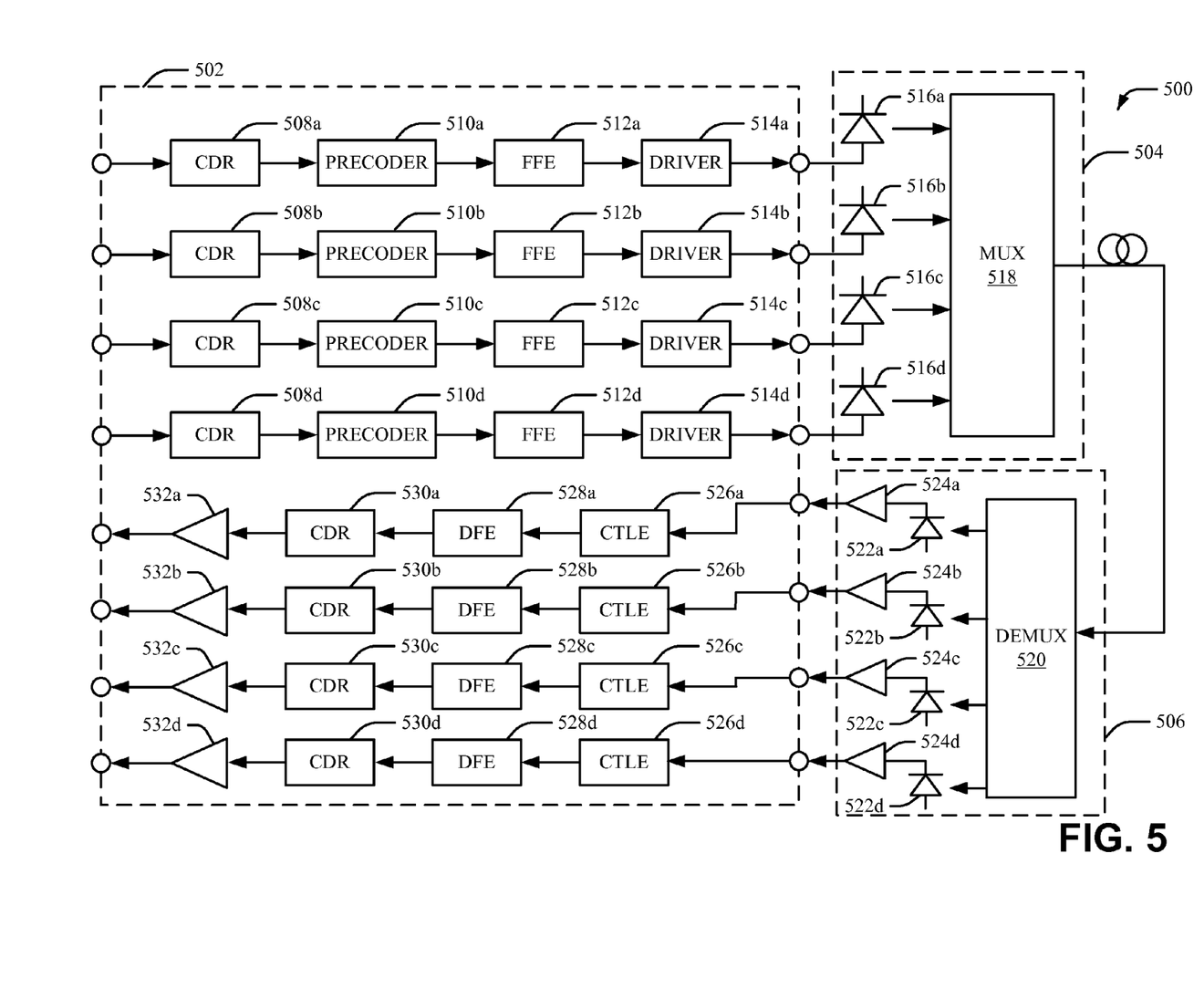
FIG. 5 illustrates a block diagram of a transceiver, in accordance with yet another embodiment.

Referring to FIG. 5, a block diagram of a transceiver system is shown, in accordance with an embodiment. Transceiver system 500 can include a transceiver component 502, a transmitter component 504 and a receiver component 506. The transceiver system 500 can be implemented to increase bandwidth efficiency of a modulated signal (e.g., an optical signal). The transceiver component 502 can include clock and data recovery (CDR) 508$a$-$d$, precoder 510$a$-$d$, FFE 512$a$-$d$ and driver 514$a$-$d$. The CDR 508$a$-$d$, the precoder 510$a$-$d$, the FFE 512$a$-$d$ and the driver 514$a$-$d$ can be implemented in a transmitter portion of the transceiver component 502. It is to be appreciated that a different number of components can be implemented in parallel in the transceiver system 500 (e.g., the transceiver component 502 can include a different number of CDR, precoder, FFE and/or driver components).

Each CDR 508$a$-$d$ can be configured to retime data (e.g., data received from a host). For example, each CDR 508$a$-$d$ can remove jitter from received data. Each CDR 508$a$-$d$ can receive data at a data rate of, for example, 25 G. However it is to be appreciated that each CDR 508$a$-$d$ can receive data at a different data rate. Each precoder 510$a$-$d$ can correspond to the precoder stage 102. Each FFE 512$a$-$d$ and/or driver 514$a$-$d$ can correspond to the encoder stage 104. In one example, each FFE 512$a$-$d$ can be implemented as a 2-bit FFE.

The transmitter component 504 can include diode 516$a$-$d$ and multiplexer 518. Each diode 516$a$-$d$ can correspond to the converter stage 106. In one example, each diode 516$a$-$n$ can be implemented as a laser diode (e.g., a DML or an EML). In one example, each diode 516$a$-$n$ can be implemented as a 10 G DML. Each diode 516$a$-$d$ can generate a directly modulated signal at a 25 G data rate. The multiplexer 518 can receive each directly modulated signal (e.g., each directly modulated signal at a 25 G data rate). The multiplexer 518 can generate a modulated signal (e.g., a modulated signal at a 100 G data rate). In one example, the multiplexer 518 can be implemented as a weight division multiplier (WDM) multiplexer.

The receiver component 506 can include demultiplexer 520, diode 522$a$-$d$ and amplifier 524$a$-$d$. The demultiplexer 520 can receive a modulated signal (e.g., a modulated signal at a 100 G data rate) from the transmitter component 504. The demultiplexer 520 can generate a plurality of modulated signals at a lower data rate. For example, in the non-limiting example shown in FIG. 5, the demultiplexer 520 can generate four modulated signals. In one example, each of the four modulated signals can include a data rate of 25 G. In one example, the demultiplexer 520 can be implemented as a WDM demultiplexer.

Each diode 522$a$-$d$ can correspond to the converter stage 201. Furthermore, each amplifier 524$a$-$d$ can correspond to the amplifier stage 202. Each diode 522$a$-$d$ can be implemented as a photodetector (e.g., a photodiode) to convert a modulated signal into an electrical current signal. In one example, each amplifier 524$a$-$d$ can be implemented as a transimpedance amplifier to convert an electrical current signal into an electrical voltage signal. Additionally, the transceiver component 502 can include CTLE 526$a$-$d$, DFE 528$a$-$d$, CDR 530$a$-$d$ and amplifier 532$a$-$d$. The CTLE 526$a$-$d$, the DFE 528$a$-$d$, the CDR 530$a$-$d$ and the amplifier 532$a$-$d$ can be implemented in a receiver portion of the transceiver component 502. It is to be appreciated that a different number of components can be implemented in parallel in the transceiver system 500 (e.g., the transceiver component 502 can include a different number of CTLE, DFE, CDR and/or amplifier components). Each CTLE 526a-d can correspond to the equalizer stage 204. Each DFE 528a-d can correspond to the equalizer stage 206. In one example, each DFE 528a-d can be implemented as a 1-tap DFE. The CDR 530a-d can be configured to retime data generated by the DFE 528a-d. In one example, each CDR 508a-d and/or amplifier 532a-d can be electrically coupled to a host (e.g., a host device). For example, each CDR 508a-d can receive data from a host and/or each amplifier 532a-d can send data to a host. In one example, each CDR 508a-d can receive data from a host at a data rate of 25 G and/or each amplifier 532a-d can send data to a host at a data rate of 25 G. The amplifiers 532a-d can be configured to amplify the retimed data (e.g., amplify the retimed data to meet a voltage level requirement of a host device). As such, bandwidth efficiency in a transceiver system can be improved.

FIGS. 6-11 show methods illustrated as flow diagrams. For simplicity of explanation, the methods are depicted and described as series of acts. However, the methods are not limited by the acts illustrated and by the order of acts. For example, acts can occur in various orders and/or concurrently, and with other acts not presented and described herein. Furthermore, not all illustrated acts may be required to implement the methods. Additionally, it should be further appreciated that the methods can be implemented on an article of manufacture to facilitate transporting and transferring the methods.

Figure 6:
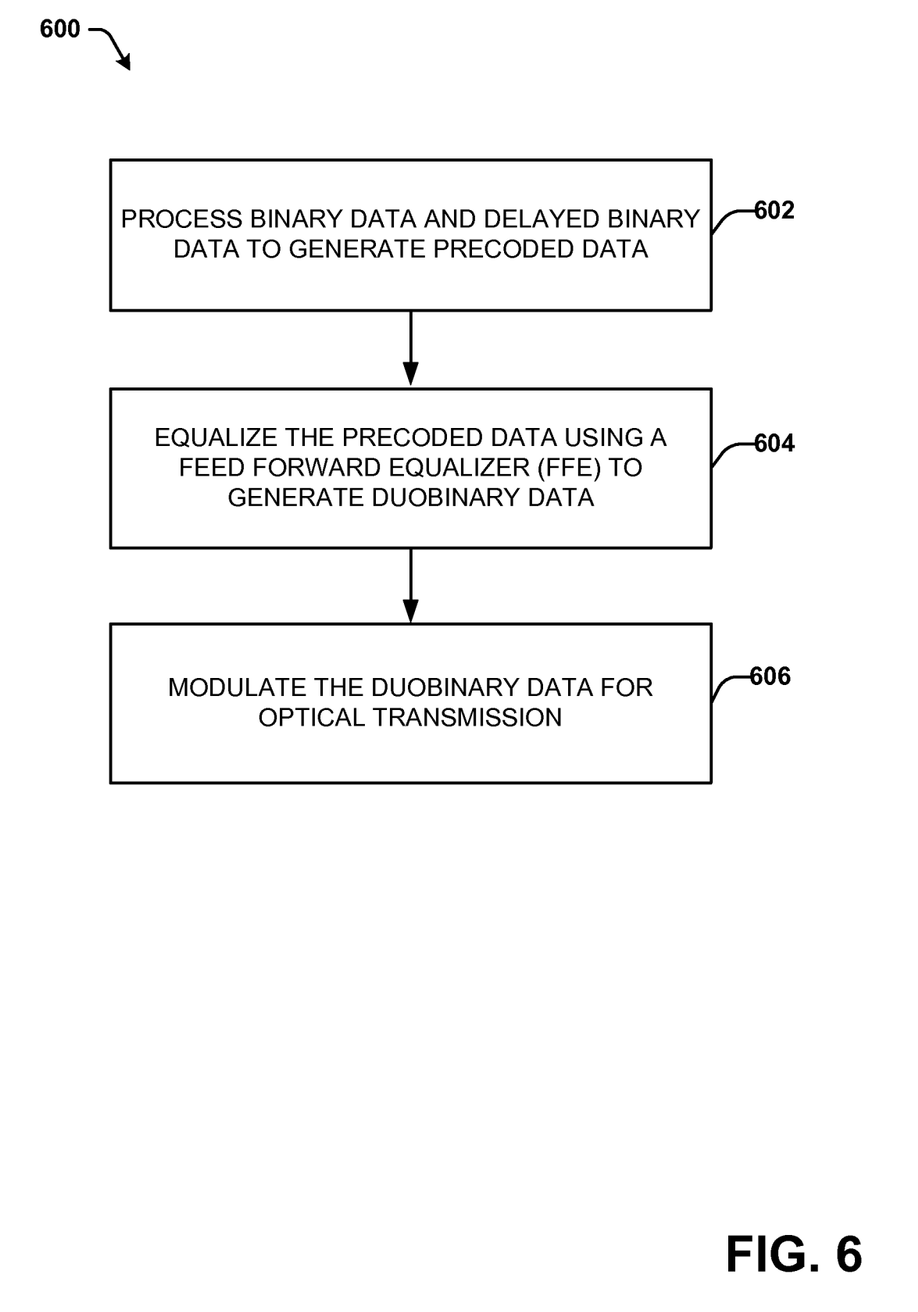
FIG. 6 depicts a method for optically transmitting modulated data via a transmitter, in accordance with another embodiment.

Referring now to FIG. 6 illustrated is a flow diagram of a method 600 for optically transmitting modulated data via a transmitter. At step 602, binary data and delayed binary data is processed (e.g., using a precoder stage 102) to generate precoded data. For example, a logic gate (e.g., an XOR gate) can receive the binary data and the delayed binary data. In one example, the delayed binary data can be generated using a delayed FIR filter. At step 604, the precoded data is equalized using a feed forward equalizer (FFE) to generate duobinary data. For example, an FFE can apply a weight (e.g., an equal weight) to the binary data and the delayed binary data. At 606, the duobinary data can be modulated (e.g., using a converter stage 106) for optical transmission. For example, band-limiting duobinary data can generated for transmission over an optical fiber.

Figure 7:
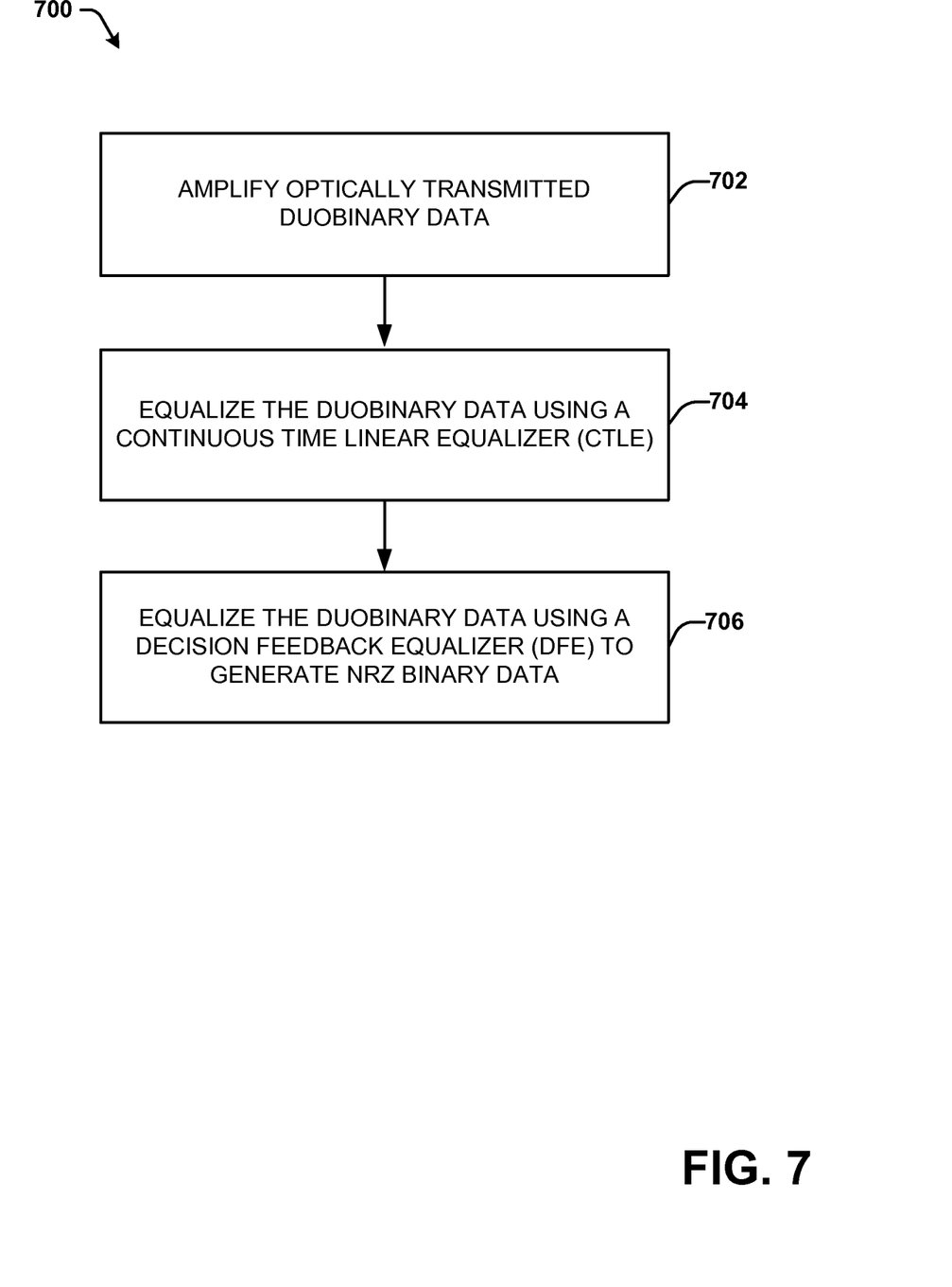
FIG. 7 depicts a method for processing modulated data via a receiver, in accordance with another embodiment.

Referring now to FIG. 7 illustrated is a flow diagram of a method 700 for processing modulated data via a receiver. In one example, the method 700 can be implemented in connection with method 600. At step 702, optically transmitted duobinary data is amplified (e.g., using an amplifier stage 202). For example, optically transmitted duobinary data can be amplified using a transinductance amplifier (TIA). Before being amplified, the optically transmitted duobinary data can be converted into an electrical signal (e.g., an electrical current signal) via at least one photodiode. At step 704, the duobinary data is equalized using a continuous time linear equalizer (CTLE). For example, a CTLE can proportionally equalize the duobinary data. At step 706, the duobinary data can be equalized using a decision feedback equalizer (DFE) to generate NRZ binary data. For example, a DFE can process duobinary data as NRZ binary data with intersymbol interference (ISI) to convert the duobinary data into NRZ binary data.

Figure 8:
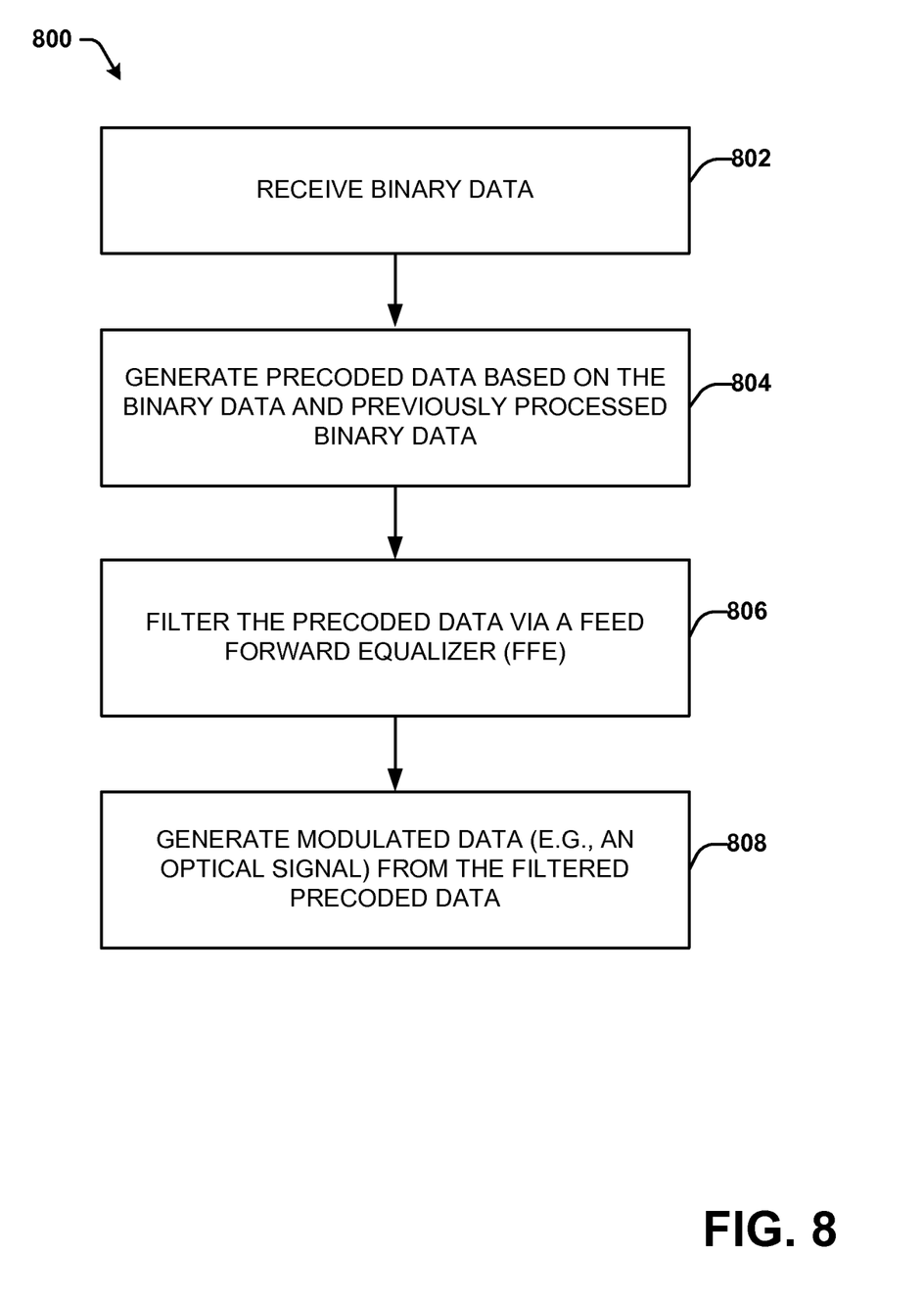
FIG. 8 depicts a method for transmitting modulated data via a transmitter, in accordance with another embodiment.

Referring now to FIG. 8 illustrated is a flow diagram of a method 800 for transmitting modulated data via a transmitter. At step 802, binary data is received. For example, binary NRZ data can be received. At step 804, precoded data is generated (e.g., using a precoder stage 102) based on the binary data and previously processed binary data. For example, a logic gate (e.g., an XOR gate) can receive the binary data and previously processed binary data (e.g., bit delayed data) generated via a delayed feedback path. At step 806, the precoded data is filtered via a feed forward equalizer (FFE) (e.g., using an encoder stage 104). For example, the FFE can apply a weight to the binary data and the previously processed binary data (e.g., the FFE can apply a 50% equal weight to the binary data and the previously processed binary data). At 808, modulated data (e.g., an optical signal) is generated (e.g., using a converter stage 106) from the filtered precoded data. For example, a laser diode can modulate the precoded data (e.g., a precoded signal) to generate modulated data (e.g., an optical signal).

Figure 9:
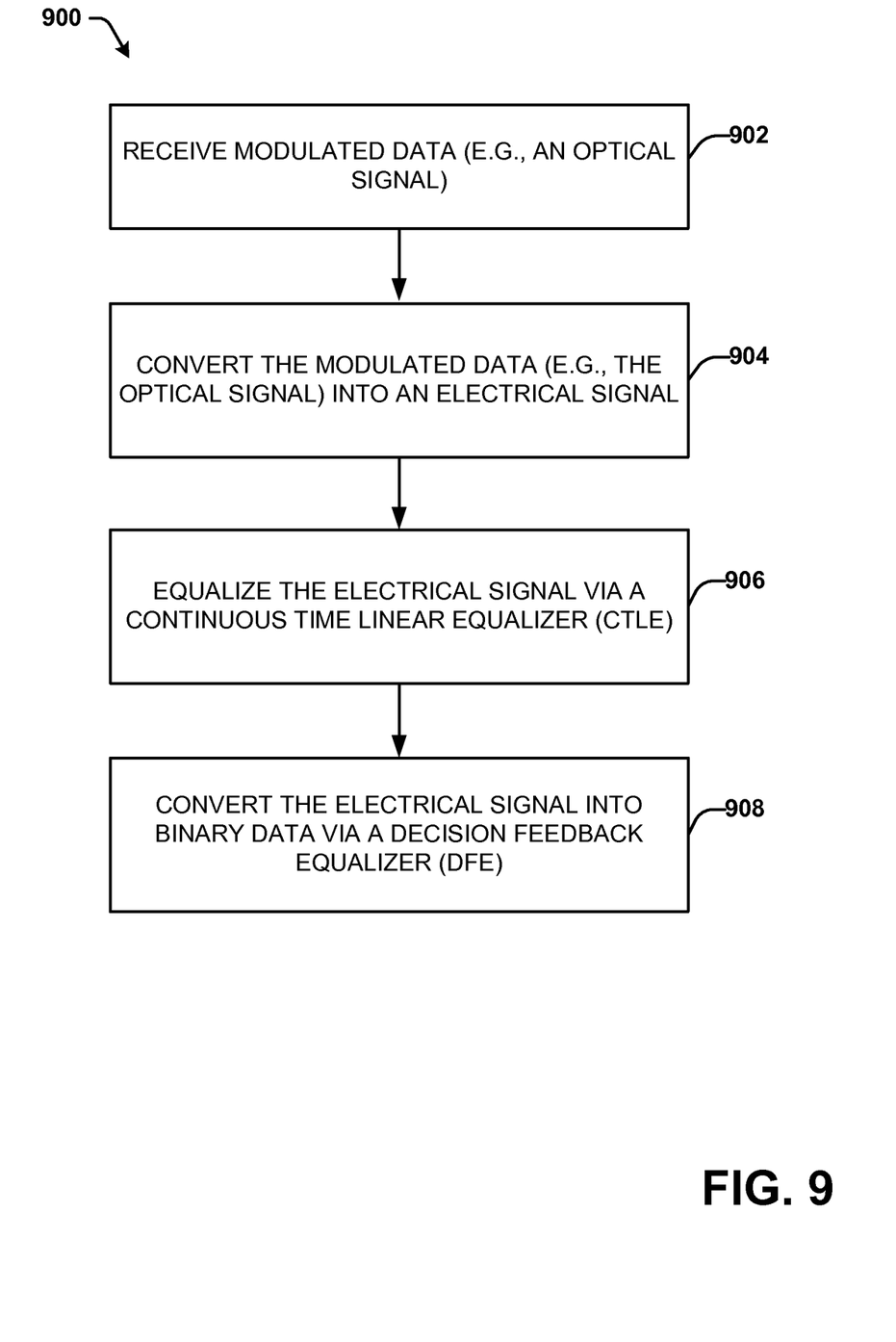
FIG. 9 depicts a method for receiving modulated data via a receiver, in accordance with another embodiment.

Referring now to FIG. 9 illustrated is a flow diagram of a method 900 for receiving modulated data via a receiver. In one example, the method 900 can be implemented in connection with method 800. At step 902, modulated data (e.g., an optical signal) is received. For example, a PAM-2 (e.g., NRZ binary) or a PAM-3 (e.g., duobinary) modulated signal can be received. In one example, the modulated data (e.g., the optical signal) can be received from the transmitter 100. At step 904, the modulated data (e.g., the optical signal) is converted (e.g., using a converter stage 201 and/or an amplifier stage 202) into an electrical signal. For example, at least one photodiode can be implemented to convert the modulated data (e.g., the optical signal) into an electrical current signal. Additionally, a TIA can be implemented to convert the electrical current signal into an electrical voltage signal. At step 906, the electrical signal is equalized via a continuous time linear equalizer (CTLE) (e.g., using an equalizer stage 204). For example, the CTLE can adjust a voltage level of the electrical signal to improve a noise margin of the analog electrical signal. At 908, the electrical signal is converted into binary data via a decision feedback equalizer (DFE) (e.g., using an equalizer stage 206). For example, the DFE can convert a PAM-3 electrical signal into binary NRZ data. In another example, the DFE can process a PAM-2 (e.g., NRZ) electrical signal to generate binary NRZ data.

Figure 10:
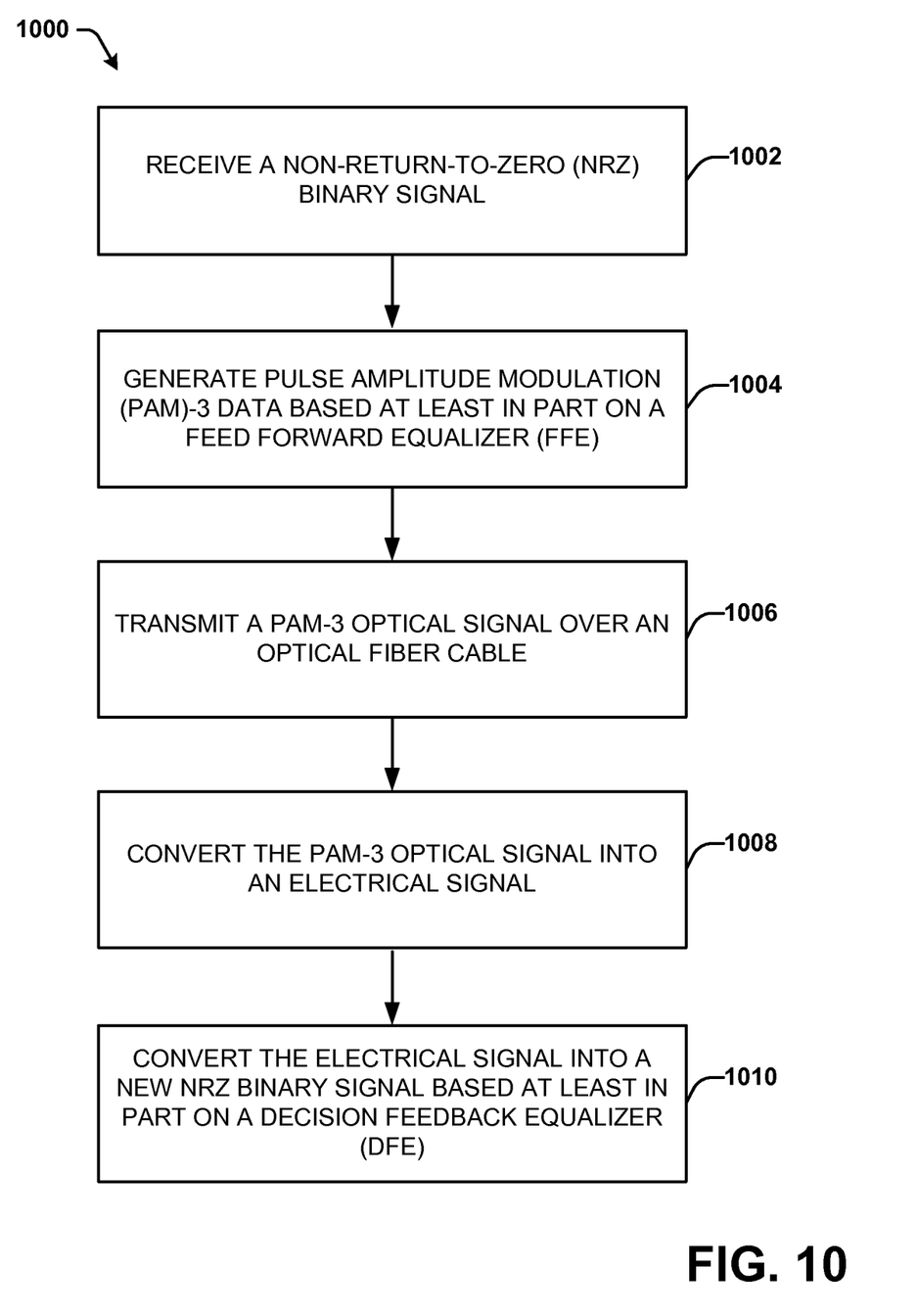
FIG. 10 depicts a method for optically transmitting duobinary data, in accordance with another embodiment.

Referring now to FIG. 10 illustrated is a flow diagram of a method 1000 for optically transmitting duobinary data. At step 1002, a non-return-to-zero (NRZ) binary signal is received. In one example, the NRZ binary signal can be received from an application specific integrated circuit (ASIC). In another example, the NRZ binary signal can be received from a CDR. At step 1004, pulse amplitude modulation (PAM)-3 data is generated based at least in part on a feed forward equalizer (FFE). For example, a FFE can provide duobinary data to a laser diode that modulates the duobinary data to generate a PAM-3 optical signal. At step 1006, a PAM-3 optical signal is transmitted over an optical fiber cable. For example, a transmitter can optically transmit the PAM-3 optical signal to a receiver. At step 1008, the PAM-3 optical signal is converted into an electrical signal. For example, a receiver can receive the PAM-3 optical signal generated by a transmitter. Additionally, the receiver (e.g., at least one photodiode in the receiver) can convert the PAM-3 optical signal into an electrical current signal. Additionally, a TIA can convert the electrical current signal into an electrical voltage signal. At 1010, the electrical signal is converted into a new NRZ binary signal based at least in part on a decision feedback equalizer (DFE). For example, a DFE can generate a new NRZ binary signal based at least in part on equalization of the electrical signal.

Figure 11:
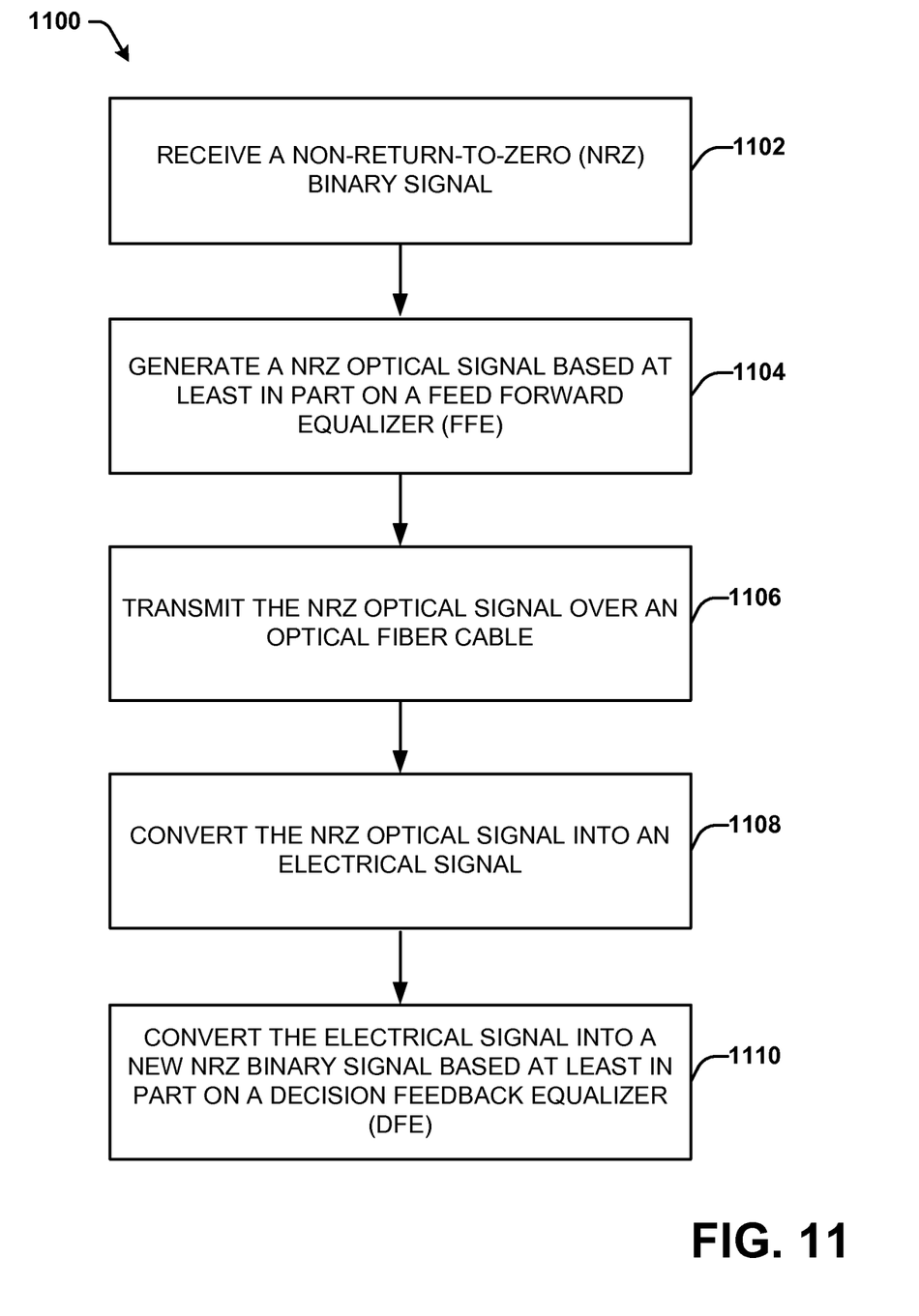
FIG. 11 depicts a method for optically transmitting binary data, in accordance with another embodiment.

Referring now to FIG. 11 illustrated is a flow diagram of a method 1000 for optically transmitting binary data. At step 1102, a non-return-to-zero (NRZ) binary signal is received. In one example, the NRZ binary signal can be received from an application specific integrated circuit (ASIC). In another example, the NRZ binary signal can be received from a CDR. At step 1104, a NRZ optical signal is generated based at least in part on a feed forward equalizer (FFE). For example, a FFE can provide NRZ data to a laser diode that modulates the NRZ data to generate a NRZ optical signal. At step 1106, the NRZ optical signal is transmitted over an optical fiber cable. For example, a transmitter can optically transmit the NRZ optical signal to a receiver. At step 1108, the NRZ optical signal is converted into an electrical signal. For example, a receiver can receive the NRZ optical signal generated by a transmitter. Additionally, the receiver (e.g., at least one photodiode in the receiver) can convert the NRZ optical signal into an electrical current signal. Additionally, a TIA can covert the electrical current signal into an electrical voltage signal. At 1110, the electrical signal is converted into a new NRZ binary signal based at least in part on a decision feedback equalizer (DFE). For example, a DFE can generate a new NRZ binary signal (e.g., a NRZ digital signal) based at least in part on equalization of the electrical signal.

As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" or "at least one" unless specified otherwise or clear from context to be directed to a singular form. Furthermore, to the extent that the terms "includes," "has," "contains," and other similar words are used in either the detailed description or the claims, for the avoidance of doubt, such terms are intended to be inclusive in a manner similar to the term "comprising" as an open transition word without precluding any additional or other elements.

The words "example" or "exemplary" are used herein to mean serving as an example, instance, or illustration. Any aspect or design described herein as "exemplary" is not necessarily to be construed as preferred or advantageous over other aspects or designs, nor is it meant to preclude equivalent exemplary structures and techniques known to those of ordinary skill in the art. Rather, use of the word exemplary is intended to present concepts in a concrete fashion. For the avoidance of doubt, the subject matter of the various different embodiments disclosed herein are not limited by such examples.

Some of the aforementioned embodiments have been described with respect to interaction between several circuits, circuit components, components, etc. that can be, e.g., included in a semiconductor, an integrated circuit, etc. It can be appreciated that such components can include those components or specified sub-components, some of the specified components or sub-components, and/or additional components, and according to various permutations and combinations of the foregoing. Sub-components can also be implemented as components electrically coupled to other components rather than included within parent components (hierarchical). Additionally, it is to be noted that one or more components may be combined into a single component providing aggregate functionality or divided into several separate sub-components, and that any one or more middle layers or components, may be provided to couple to such sub-components in order to provide integrated functionality. Any components described herein may also interact with one or more other components not specifically described herein but generally known by those of skill in the art.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A transceiver, comprising:
   a transmitter including a precoder stage that generates a precoded signal based on an input binary signal and a previously processed binary signal, an encoder stage that includes a feed forward equalizer (FFE) and adds intentional distortion to the precoded signal, and a first converter stage that generates a modulated signal based on the precoded signal, wherein the encoder stage is electrically coupled to the precoder stage and the first converter stage; and
   a receiver including a second converter stage that receives the modulated signal, a continuous time linear equalizer (CTLE) electrically coupled to an amplifier stage, and a decision feedback equalizer (DFE) electrically coupled to the CTLE, wherein at least the CTLE proportionally equalizes the modulated signal via linear equalization to compensate for the intentional distortion added by the encoder stage, and the DFE converts the modulated signal into an output binary signal.

2. The transceiver of claim 1, wherein the modulated signal is a non-return-to-zero (NRZ) signal.

3. The transceiver of claim 1, wherein the modulated signal is a pulse amplitude modulation (PAM)-3 signal.

4. The transceiver of claim 1, wherein the precoder stage includes a delayed finite impulse response filter.

5. The transceiver of claim 1, wherein the FFE applies an equal weight to the input binary signal and the previously processed binary signal.

6. The transceiver of claim 1, wherein the first converter stage includes an electrical-optical converter.

7. The transceiver of claim 1, wherein the transmitter further includes a clock and data recovery circuit that retimes data to generate the input binary signal.

8. The transceiver of claim 1, wherein the amplifier stage includes a transimpedance amplifier (TIA).

9. The transceiver of claim 1, wherein the encoder stage adds the intentional distortion to the precoded signal based on the input binary signal and the previously processed binary signal.

10. The transceiver of claim 1, wherein the CTLE proportionally adjusts a voltage level of an electrical signal generated from the modulated signal.

11. The transceiver of claim 10, wherein the DFE equalizes the electrical signal.

12. The transceiver of claim 1, wherein the DFE includes a finite impulse response filter.

13. The transceiver of claim 1, wherein the DFE includes an infinite impulse response filter.

14. A method for optical transmission, comprising:
receiving binary input data;
generating precoded data based on the binary input data and previously processed binary data;
filtering the precoded data via a feed forward equalizer (FFE), including introducing intentional distortion to the precoded data, to generate multilevel data;
generating a modulated signal from the multilevel data; and
converting the modulated signal into binary output data based at least in part on a decision feedback equalizer (DFE) coupled to a continuous time linear equalizer (CTLE), including proportionally equalizing the modulated signal via at least linear equalization associated with the CTLE to compensate for the intentional distortion.

15. The method of claim 14, wherein the converting includes converting the modulated signal into an electrical signal.

16. The method of claim 15, wherein the converting includes equalizing the electrical signal via the CTLE.

17. The method of claim 15, wherein the converting includes converting the electrical signal into the binary output data via the DFE.

18. A system, comprising:
a transmitter that generates a modulated duobinary signal, wherein the transmitter includes at least a feed forward equalizer (FFE) that adds intentional distortion to the modulated duobinary signal; and
a receiver that generates an electrical signal from the modulated duobinary signal, wherein the receiver includes at least a decision feedback equalizer (DFE) coupled to a continuous time linear equalizer (CTLE) that proportionally equalizes the electrical signal based on linear equalization to offset the intentional distortion added by the FFE.

19. The system of claim 18, wherein the transmitter receives a binary signal.

20. The system of claim 18, wherein the receiver generates a binary signal.

* * * * *